HARRIETT A. SCHANDEVYL.
Corset.
No. 162,580. Patented April 27, 1875.
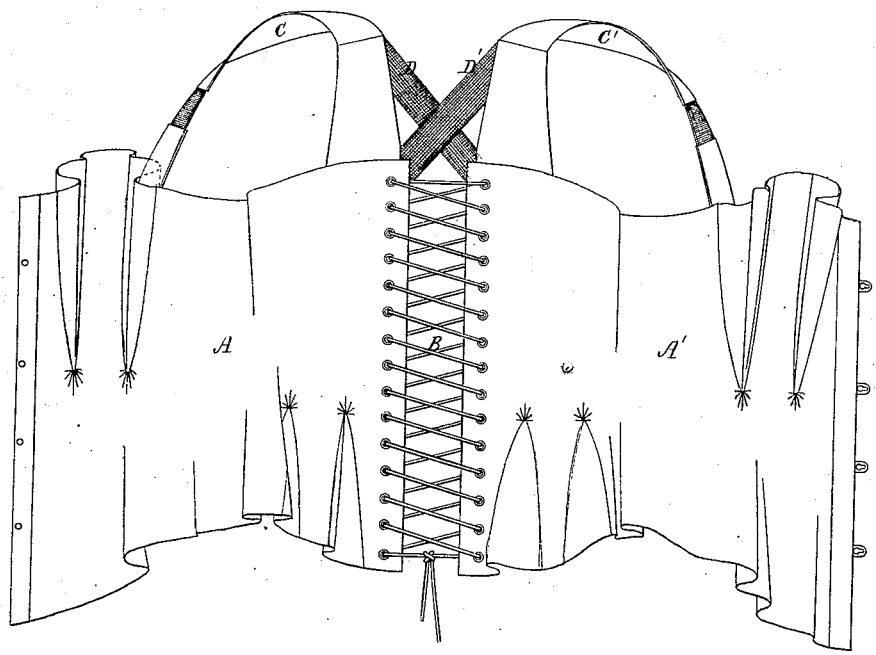
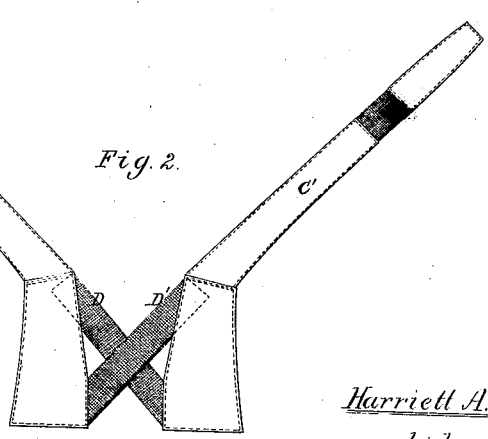

UNITED STATES PATENT OFFICE.

HARRIETT A. SCHANDEVYL, OF EAST SAUGUS, MASSACHUSETTS.

IMPROVEMENT IN CORSETS.

Specification forming part of Letters Patent No. 162,580, dated April 27, 1875; application filed February 3, 1875.

*To all whom it may concern:*

Be it known that I, HARRIETT A. SCHANDEVYL, of East Saugus, of the county of Essex and State of Massachusetts, have made a new and useful invention having reference to Corsets; and do hereby declare the same to be fully described in the following specification and represented in the accompanying drawings, of which—

Figure 1 is an elevation of a corset with my addition. Fig. 2 is a view of the shoulder-straps and oblique connection-straps, as arranged and combined for being applied or fastened to the two sections of a corset.

The corset shown in said drawings, like most others in use, is composed of two main portions, halves, or sections, A A′, connected at their rear or back edges by a lacing, B, going through a series of eyelets in each portion A or A′.

In carrying out my invention, I combine such a corset with two shoulder-straps, and two elastic or inelastic crossed bands or webs, arranged between and connecting the two shoulder-straps, all substantially as shown in the drawing, in which C and C′ are the two shoulder-straps, and D and D′ the crossed bands or webbings. Each of the said webbings D D′ extends from one shoulder-strap to the other, and in so doing crosses the other of the said bands. Or, instead of fastening each band or webbing D or D′ at its lower end directly to one of the shoulder-straps, the said band, at its lower end, may be fastened immediately to the upper part of the portion A or A′ of the corset, from which such shoulder-strap may be extended; the object of my invention being to connect each shoulder-strap with both of the parts A A′ instead of with one only of them, such being in order that the said parts A A′, at the back, may be supported, and the shoulder-straps kept in place on the shoulders to better advantage, and the combined shoulder-straps and crossed webbings be made to serve as a shoulder-brace. The shoulder-straps, at their front ends, are to be fastened in any proper manner or by any suitable means to the two halves A A′ of the corset.

I do not claim a corset having the rear portion of each half-section extended obliquely upward to form straps to cross each other and pass over the shoulders of the wearer when the corset may be in use, such being as shown by the United States Patent No. 156,278, in which case each shoulder-strap, at its rear end or part, becomes connected with but one of the sections, whereas by my improvement or invention each shoulder-strap becomes connected on the back of the corset with both of the sections, and thereby is productive of new and useful results or advantages; nor do I claim corset shoulder-straps connected by a single cross-piece, as shown in the United States Patent No. 39,126; nor do I claim, in a brace or suspenders, the shoulder-straps connected by a lacing, as shown in United States Patent No. 6,512; nor do I claim back-straps of a shoulder-brace or suspenders connected together by one or more horizontal straps, as shown in the United States Patent No. 90,974; nor do I claim the back of a corset made in manner as shown in the British Patent No. 547, for 1852. Neither of such patents exhibits my invention, nor any approach to it, for in neither is a corset represented having each shoulder-strap directly connected with both the back portions of the said corset; nor have the shoulder-straps connections that cross each other obliquely above the body portions of the corset, as in my invention.

I claim as my invention as follows—that is to say:

1. In combination with the two portions A A′ of a corset, provided with a shoulder-strap, C or C′, to each of them, as set forth, the two intermediate crossed straps D D′, arranged above the said portions A A′, and applied so as to connect the said two shoulder-straps, in manner as set forth, or cause each of them to be connected with both of said portions A A′, all substantially as specified.

2. The two corset shoulder-straps C C, provided with the oblique connection-straps D D′, arranged and connected with them as described.

HARRIETT A. SCHANDEVYL.

Witnesses:
R. H. EDDY,
J. R. SNOW.